(12) United States Patent
Roehm et al.

(10) Patent No.: US 9,815,352 B2
(45) Date of Patent: Nov. 14, 2017

(54) IMPACT BEAM FOR VEHICLE SIDE DOOR INTRUSION RESISTANCE

(71) Applicant: Shape Corp., Grand Haven, MI (US)

(72) Inventors: Paul Michael Roehm, Grand Haven, MI (US); Corey J. Hoff, Spring Lake, MI (US)

(73) Assignee: Shape Corp., Grand Haven, MI (US)

( * ) Notice: Subject to any disclaimer, the term of this patent is extended or adjusted under 35 U.S.C. 154(b) by 37 days.

(21) Appl. No.: 15/099,979

(22) Filed: Apr. 15, 2016

(65) Prior Publication Data

US 2016/0303952 A1 Oct. 20, 2016

Related U.S. Application Data

(60) Provisional application No. 62/149,078, filed on Apr. 17, 2015.

(51) Int. Cl.
*B60J 5/04* (2006.01)

(52) U.S. Cl.
CPC ........... *B60J 5/0423* (2013.01); *B60J 5/0425* (2013.01); *B60J 5/0443* (2013.01); *B60J 5/0444* (2013.01); *B60J 5/0461* (2013.01)

(58) Field of Classification Search
CPC ....... B60J 5/0425; B60J 5/0423; B60J 5/0443
USPC .................................................. 296/187.12
See application file for complete search history.

(56) References Cited

U.S. PATENT DOCUMENTS

| 5,452,545 A | 9/1995 | Siekmeyer et al. |
| 6,020,039 A | 2/2000 | Cline et al. |
| 6,591,577 B2 * | 7/2003 | Goto ...................... B60J 5/0444 138/115 |
| 6,722,037 B2 * | 4/2004 | Nees ...................... B60J 5/0444 29/897.2 |
| 6,908,141 B2 * | 6/2005 | Doi ......................... B60J 5/0444 296/146.6 |
| 7,144,072 B2 * | 12/2006 | Wallstrom ............. B60J 5/0426 296/146.6 |
| 8,727,421 B2 | 5/2014 | Cohoon |

FOREIGN PATENT DOCUMENTS

| JP | 04260815 | 9/1992 |
| JP | 06040255 | 2/1994 |
| JP | 2013028243 | 2/2013 |

OTHER PUBLICATIONS

Iinternational Search Report and Written Opinion dated Jul. 20, 2016 from corresponding PCT Application No. PCT/US2016/027743.

* cited by examiner

*Primary Examiner* — Pinel Romain
(74) *Attorney, Agent, or Firm* — Gardner, Linn, Burkhart & Flory, LLP

(57) ABSTRACT

An impact beam for reinforcing a vehicle door includes an elongated beam having a hollow interior spanning a length of the elongated beam. The elongated beam includes an impact portion spanning the length and configured to face an exterior side of the vehicle door. The elongated beam also includes a cross-sectional shape having a top wall section and a bottom wall section that interconnect at a bend section of the cross-sectional shape, which includes the impact portion. The top and bottom wall sections each include an intermediate bend to define a substantially horizontal section and an angled section on opposing sides of the intermediate bend, where the intermediate bends are configured to limit inward displacement of the elongated beam from an impact force at the exterior side of the vehicle door.

20 Claims, 7 Drawing Sheets

IMPACT BEAM FOR VEHICLE SIDE DOOR INTRUSION RESISTANCE

CROSS-REFERENCE TO RELATED APPLICATIONS

The present application claims benefit under 35 U.S.C. §119(e) of U.S. Provisional Application Ser. No. 62/149,078, entitled IMPACT BEAM FOR VEHICLE SIDE DOOR INTRUSION RESISTANCE, filed Apr. 17, 2015, which is hereby incorporated herein by reference in its entirety.

FIELD OF THE INVENTION

The present invention generally relates to impact beams for reinforcing vehicle body components, and more particularly to impact beams that reinforce vehicle side doors and prevent intrusion into a vehicle cabin upon impact to the vehicle door.

BACKGROUND OF THE INVENTION

It is generally known to mount or otherwise provide an impact beam across a frame of a vehicle door to prevent intrusion into a vehicle cabin upon the occurrence of a side impact collision to the vehicle door. It is particularly common to use door impact beams that have a tubular shape with a circular cross section, which usually are configured for desired intrusion resistance by adjusting the gauge or thickness of the steel tubing, adjusting the diameter of the tubular shape, and/or mounting additional or fewer door impact beams to the door frame, which can undesirably increase the overall weight of a vehicle door when designed to meet safety standards. It is also known to provide a door impact beam, such that described in U.S. Pat. No. 6,020,039.

SUMMARY OF THE PRESENT INVENTION

The present invention provides an impact beam or device, such as an elongated beam, configured to be mounted on a door of a vehicle with a contact portion of the beam facing an exterior side of the door. The impact beam is configured with a cross-sectional shape having a top wall section and a bottom wall section that each include an intermediate bend to define a first section, which may be planar and horizontally oriented, and a second section, which angles from the first section and extends toward the contact portion of the beam. The top and bottom wall sections thereby each have at least two sections distinctly angled from each other. Accordingly, the intermediate bends that form the first and second sections of the top and bottom wall sections are specifically configured to enhance the force deflection characteristics of the beam for side-impact forces delivered to the contact portion, or when designed for a universal force deflection standard, to allow the impact beam to be lighter in weight.

According to one aspect of the present invention, an impact beam for reinforcing a vehicle door includes an elongated beam having a hollow interior spanning a length of the elongated beam. The elongated beam includes an impact portion spanning the length and configured to face an exterior side of the vehicle door. The elongated beam also includes a cross-sectional shape having a top wall section and a bottom wall section that interconnect at a bend section of the cross-sectional shape, which includes the impact portion. The top and bottom wall sections each include an intermediate bend to define a substantially horizontal section and an angled section on opposing sides of the intermediate bend, where the intermediate bends are configured to limit inward displacement of the elongated beam from an impact force at the exterior side of the vehicle door.

According to another aspect of the present invention, a door impact beam includes an elongated hollow beam having a side-impact surface configured to face toward an exterior side of a vehicle door and opposing ends configured to be disposed at a peripheral frame of the vehicle door. The elongated hollow beam includes a cross-sectional shape having a top wall section and a bottom wall section that interconnect at a rounded impact point that includes the side-impact surface. The top and bottom wall sections of the cross-sectional shape each include a first substantially planar section and a second substantially planar section angled from the first substantially planar section, where the second substantially planar sections of the top and bottom wall sections interconnect at the rounded impact point. A length of at least one of the first substantially planar sections is greater than or equal to a length of the corresponding second substantially planar section so as to limit displacement of the elongated hollow beam toward an interior side of the vehicle door from an impact force at the exterior side of the vehicle door.

According to yet another aspect of the present invention, an impact beam for preventing inward displacement of a vehicle door includes an elongated beam roll formed from a metal sheet. The elongated beam has a contact portion configured to face an exterior side of the vehicle door. The elongated beam also includes a cross-sectional shape having a top wall section and a bottom wall section that each include an intermediate bend to define a first planar section and a second planar section on opposing sides of the intermediate bend, where the first planar sections are substantially parallel with each other and the second planar sections are angled toward each other.

These and other objects, advantages, purposes, and features of the present invention will become apparent upon review of the following specification in conjunction with the drawings.

DETAILED DESCRIPTION OF EMBODIMENTS

Figure 2:
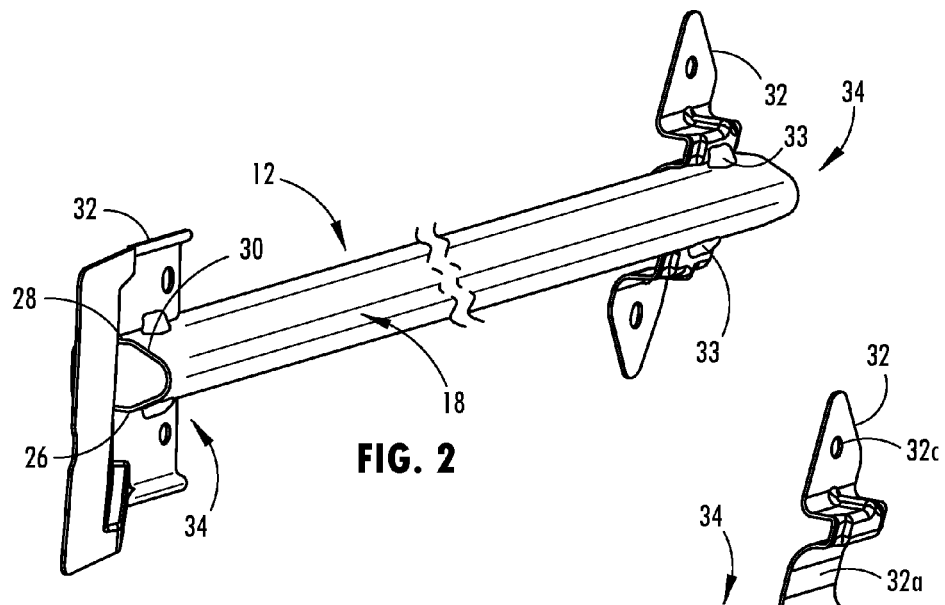
FIG. 2 is an upper perspective view of an impact beam shown in FIG. 1A and the associated mounting brackets, in accordance with the present invention.

Referring now to the drawings and the illustrative embodiments depicted therein, a door impact device or beam 10 is provided with an elongated beam 12 that is configured to be disposed or mounted at a door 14 of a vehicle 16, such as a passenger side or driver side door. The elongated beam 12 is arranged with an impact or contact portion 18 of the elongated beam 12 facing an exterior side 20 of the door 14, such that a side-impact force F (FIG. 5) or the like that is delivered to the contact portion 18 of the elongated beam 12 is at least partially absorbed by the beam and inward deformation and displacement of the vehicle door 14 is reduced or otherwise prevented by the beam. To provide increased energy absorption of an impact force to the contact portion 18, the elongated beam 12 is configured with a cross-sectional shape having a top wall section 22 and a bottom wall section 24 that each include an intermediate bend 26 (FIG. 2B). The intermediate bends 26 define, on opposing sides of each bend 26, a first portion or section 28 and a second portion or section 30 of the respective top and bottom wall sections 22, 24.

Figure 2A:
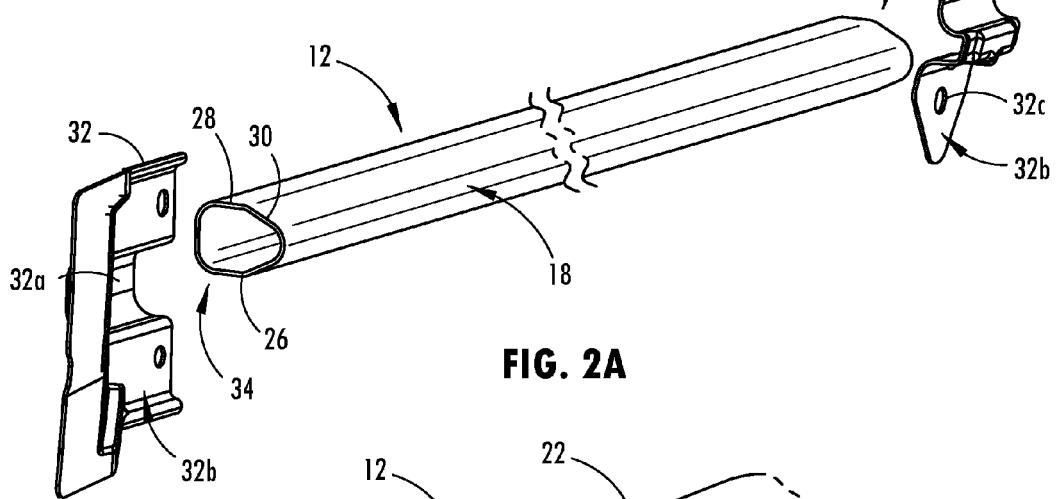
FIG. 2A is an exploded upper perspective view of the impact beam and the mounting brackets shown in FIG. 2.
Figure 2B:
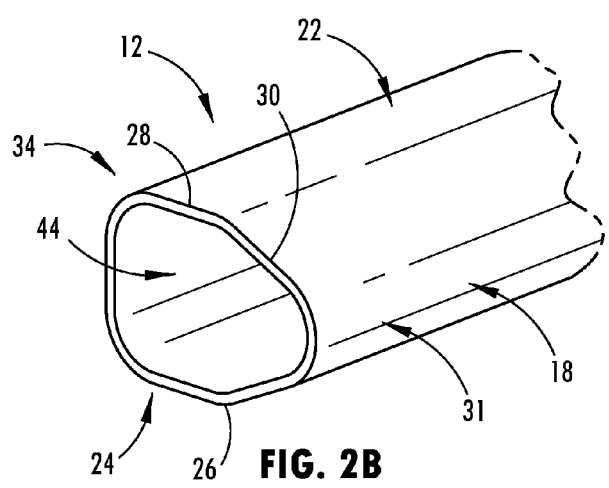
FIG. 2B is an enlarged upper perspective view of an end section of the impact beam as shown in FIG. 2A.
Figure 3:
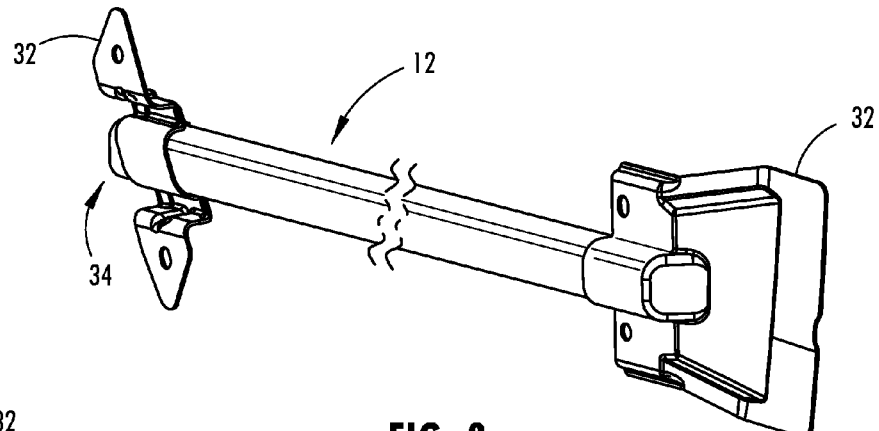
FIG. 3 is an upper perspective view of the impact beam and the mounting brackets shown in FIG. 2, taken from an opposing side of the impact beam and mounting brackets from the view shown in FIG. 2.
Figure 3A:
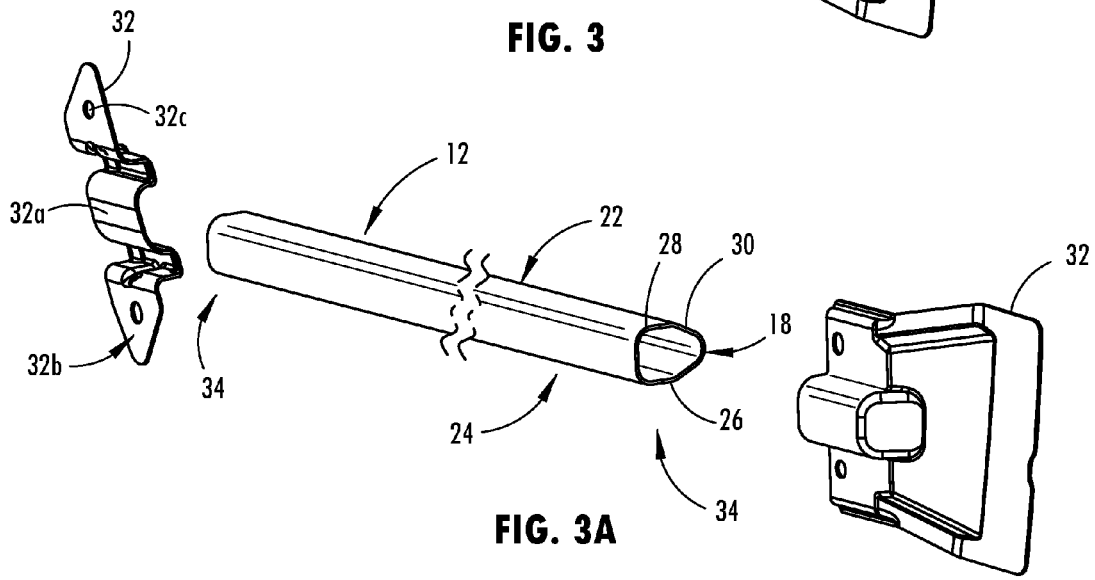
FIG. 3A is an exploded upper perspective view of the impact beam and the mounting brackets shown in FIG. 3.
Figure 3B:
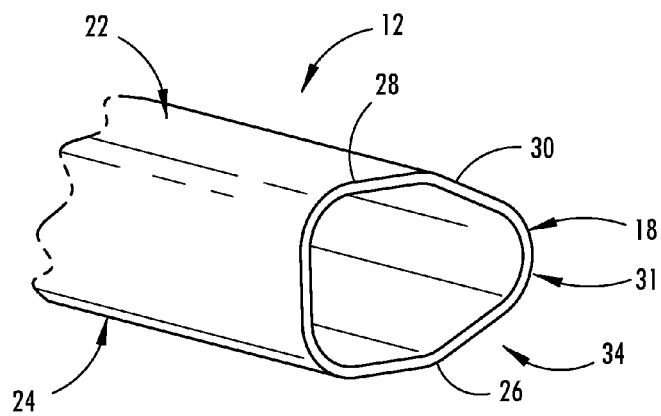
FIG. 3B is an enlarged upper perspective view of an end section of the impact beam as shown in FIG. 3A.
Figure 4:
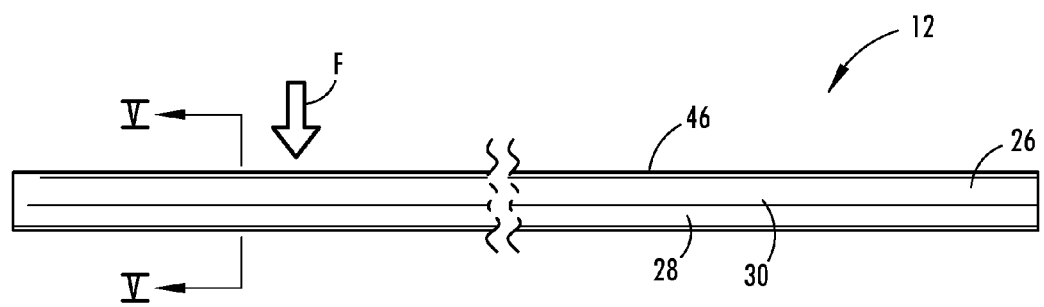
FIG. 4 is a top plan view of an impact beam showing a side-impact force direction arrow pointing toward an exterior portion of the impact beam.
Figure 5:
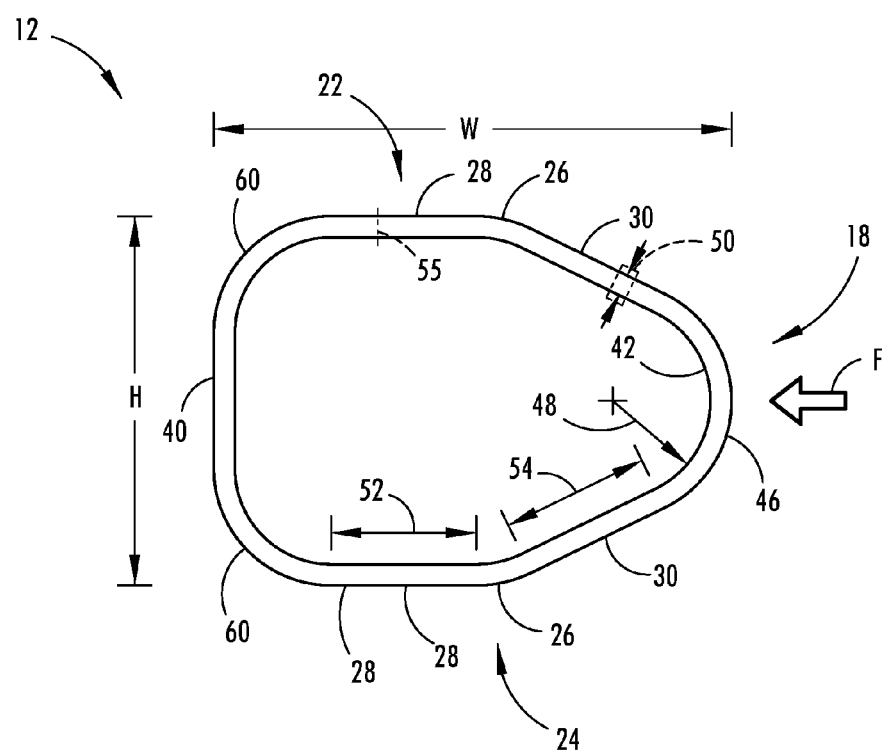
FIG. 5 is a cross-sectional view of the impact beam, taken at line V-V shown in FIG. 4, illustrating the side impact force direction arrow pointing toward the impact beam.

As shown at ends 34 of the elongated beam 12 illustrated in FIGS. 2B and 3B and at the cross section illustrated in FIG. 5, the second sections 30 are closer to or more proximate the contact portion 18 of the beam 12 than the first sections 28 and may interconnect at an exterior facing, rounded section or bend section or bent point 31 of the beam 12, which includes the contact portion 18 of the beam 12. Also, the first sections 28 may be substantially planar and horizontally oriented, and may thereby be referred to as the planar horizontal section 28, and the second sections 30 may be substantially planar and angled from the first sections 28, and may thereby be referred to as the planar angled sections 30.

The intermediate bends 26 are configured to enhance the force deflection characteristics of the top and bottom wall sections 22, 24 of the beam 10 due to an impact force F delivered to the contact portion 18 of the elongated beam 12, such as a lateral side-impact force against an exterior side of the side door (FIG. 1) of a vehicle Likewise, when the impact beam 10 having the intermediate bends 26 is designed for a universal safety standard or generally constant force deflection characteristics, less material may be used to form the beam 12 when compared to impact beams having a circular cross-section. For example, the impact beam 10 having the intermediate bends 26 may use a thinner gauge steel sheet used to roll form the beam, which results in lower cost and less weight than previous door impact beams. Improvements to impact energy absorption, cost savings, and mass reduction are critical considerations and even small improvements to these considerations are significant in view of increasing gas mileage and emissions requirements.

Figure 1:
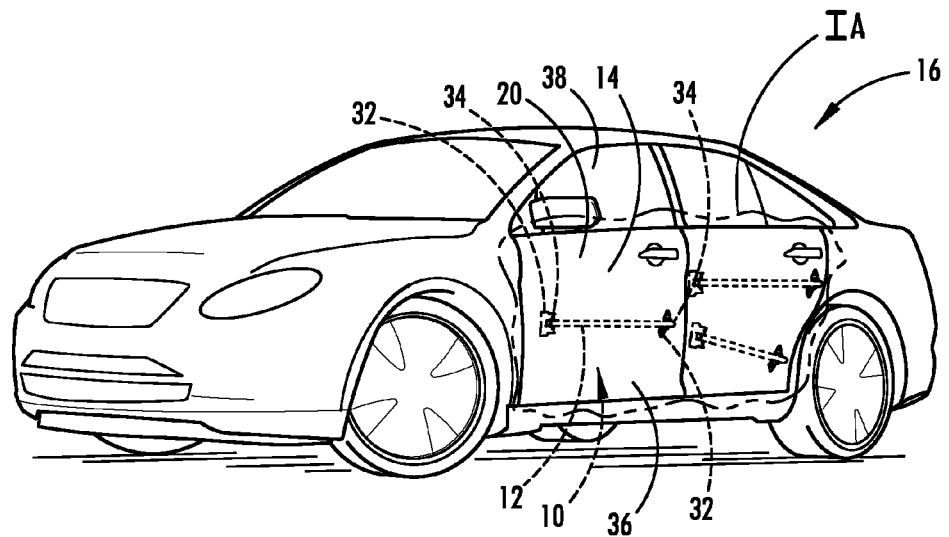
FIG. 1 is a perspective view of a vehicle having impact beams arranged at side doors of the vehicle, in accordance with the present invention.

With reference to the door impact device or beam 10 shown in FIG. 1, the vehicle 16 is depicted with a front side door 14 having connection features or mounts 32 securing the ends 34 of the elongated beam 12 to opposing forward and rearward locations of the door 14, such that the elongated beam 12 spans across a central area of the door 14, between a bottom section 36 of the door frame and a window 38 of the door. The central area of the door is typically otherwise unsupported by a frame section of the vehicle door 14, such that the opposing ends 34 of the elongated beam 12 may mount or attach to a peripheral frame or structure of the vehicle door 14 and reinforce the door 14 across the central area. As generally understood, the elongated beam 12 may be disposed within or inside the door 14 between the exterior body panel and the interior trim panel of the door 14, thereby concealing the impact beam 10 from appearance on a finished vehicle door.

Figure 1A:
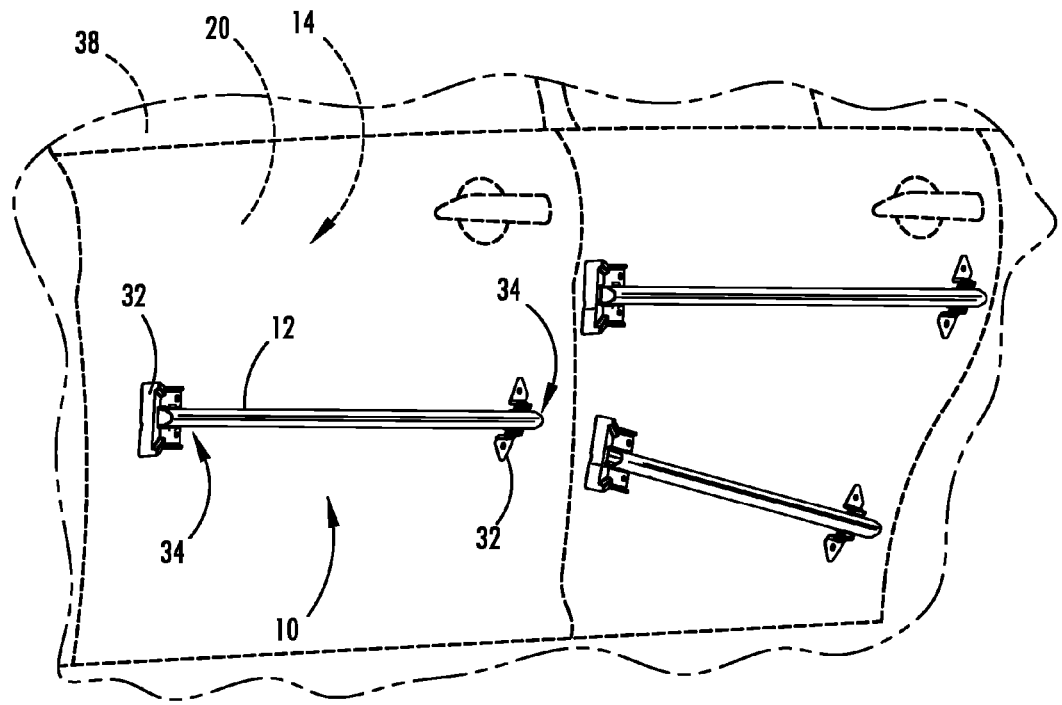
FIG. 1A is an enlarged perspective view of a section of the vehicle designated at an outlined area IA shown in FIG. 1, illustrating the impact beams arranged at the side doors.

As shown generally in FIGS. 1 and 1A, the mounts 32 are configured to rigidly and securely support the elongated beam 12 across the central area of the door 14 at a generally horizontal orientation, although other orientations are contemplated for the elongated beam, such as angled diagonally or oriented vertically. The elongated beam 12 is arranged with the contact portion 18 of the elongated beam 12 facing outward and with the beam 12 spanning over desired areas of the door 14 to prevent or resist intrusion in those areas, such as to receive probable impact forces. For instance, the beam 12 may be arranged at a height and orientation that aligns with lateral side-impact locations for common vehicles or vehicle types. The illustrated connection features or mounts 32 are provided as separate mounting brackets 32 that attach to the door frame and engage end portions of the elongated beam 12 to support the beam 12 in the desired location and orientation. Optionally, the connection features or mounts may be integrally formed with the ends of the elongated beam; may be separate brackets, weld joints, or fasteners; and may otherwise be integrally formed with a portion of the frame of the vehicle door. It is also contemplated that the impact beam may optionally be mounted to alternative vehicle doors, such as a rear side door, a sliding door, or a rear hatch door, and may also be incorporated in other structural areas of a vehicle not at or otherwise incorporated with an access door.

With reference to the illustrated mounting brackets 32 shown in FIGS. 2A and 3A, the brackets each include a central U-shaped support portion 32a that engages the interior side and the top and bottom wall sections 22, 24 of the elongated beam 12. The brackets 32 also include attachment flanges 32b that integrally extend from opposing sides of the U-shaped support portion 32a in a manner adapted to attach to the vehicle frame, such as via fasteners through the holes 32c to engage the peripheral frame of the vehicle door as shown in FIG. 1. When the end portions of the elongated beam 12 are engaged with the U-shaped support portions 32a, they may be welded or otherwise fixed together, such as shown in FIG. 2 with welding locations 33 between the top and bottom wall section 22, 24 and the flanges 32b of the brackets 32.

The elongated beam 12 of the door impact device 10, as shown in FIGS. 2-5, has a hollow interior 44 and a closed cross-sectional shape spanning the length of the beam 12. The cross-sectional shape of the beam 12 includes the top wall section 22 and the bottom wall section 24 integrally interconnecting on an interior side via an interior wall section 40 and on an exterior side via an exterior wall section 42, also shown as the rounded bend section 31, thereby surrounding the hollow interior volume 44 of the elongated beam 12. In additional embodiments, the top and bottom wall sections 22, 24 may be alternatively interconnected or otherwise unconnected, such as by lacking an exterior wall section to provide an open cross-sectional shape, while maintaining the intermediate bends 26 in the top and bottom wall sections 22, 24. The exterior wall section 42 of the elongated beam 12 includes the contact portion 18 of the elongated beam 12, which as illustrated, is provided by the rounded bend point or section 31 formed between the second sections 30 (i.e. the planar angled portions) of the top and bottom wall sections 22, 24. The exterior surface of the rounded bend point 31 provides a curved impact surface 46 (FIG. 5) of the elongated beam 12 that faces the exterior side 20 of the door 14. The curvature of the impact surface 46 may vary in additional embodiments of the elongated beam 12 based on the radius of curvature of the rounded bend point, which can be dependent on material property constraints, such as the malleability of the sheet metal used to roll form the elongated beam 12. In the illustrated embodiment, the bend point or section 31 having an inside radius 48 generally equal to or about four times a thickness 50 of the metal sheet used to form the elongated beam 12. However, it is contemplated that the radius may optionally be larger or smaller, such as when using different materials and/or forming methods.

The intermediate bends 26 in the top and bottom wall sections 22, 24 may be bent via a roll-forming process or otherwise formed to define, on opposing side of the bend 26, the first or horizontal section 28 and the second or angled section 30. The angled sections 30 are more proximate the contact portion 18 of the elongated beam 12, as the angled sections 30 interconnect via the bend point 31 in the exterior wall section 42. Upon receiving an impact force F (FIG. 5) at the contact portion 18 of the elongated beam 12, the impact force is transmitted along the angled sections 30 and to the horizontal sections 28, and may thereby create compressive stresses at the contact portion 18 and in the angled sections 30 of the top and bottom wall sections 22, 24, while tensile stresses may be created in the interior wall section 40 and in the horizontal sections 28 of the top and bottom wall sections 22, 24. To improve force transmission between the angled and horizontal sections 30, 28, the intermediate bends 26 may be formed at identical or substantially identical locations in the top and bottom wall sections 22, 24. The intermediate bend points 26 may be provided at similar locations on the top and bottom wall sections 22, 24 of the elongated beam 12 to allow for generally consistent energy transmission in the top and bottom wall sections. This generally consistent energy transmission in the top and bottom wall sections prevents torsion in the beam, which would otherwise put additional stresses on the mounts 32 and create conditions for premature bending failure (e.g. before one of the top or bottom wall sections reaches load capacity). As such, the planar horizontal sections 28 may be spaced from each other and may be substantially parallel relative to each other, such as shown in FIG. 5, which results in the cross-sectional shape of the elongated beam 12 being generally symmetrical about a vertically centered horizontal plane or line.

Figure 6:
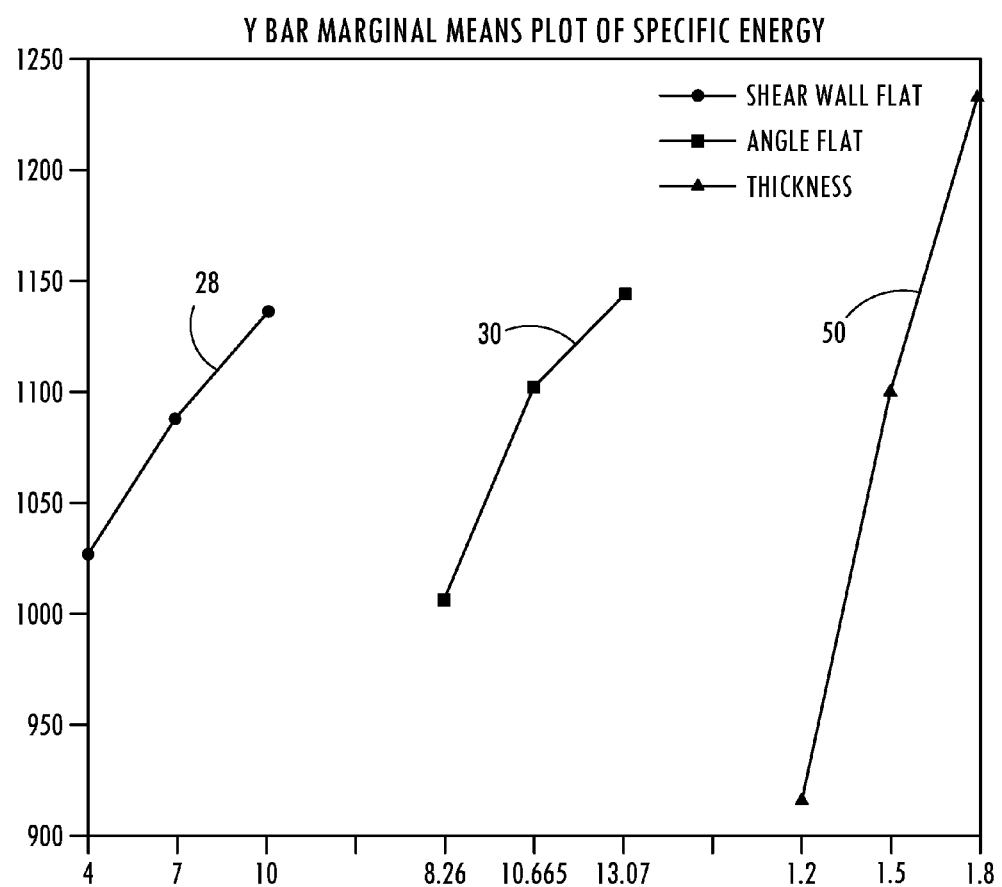
FIG. 6 is a marginal means plot showing energy absorption behavior of the impact beam when various characteristics of the impact beam are adjusted.

To further improve impact energy absorption properties and force transmission between the angled and horizontal sections 30, 28, the intermediated bends 26 are positioned to create the length 52 (FIG. 5) of the horizontal section 28 to be greater than or equal to the length 54 (FIG. 5) of the corresponding angled section 30. As illustrated in FIG. 6, increasing the lengths of the angled sections 30 (referred to as angled flat) has diminishing improvements to energy absorption, while increasing the lengths of the horizontal sections 28 (referred to as shear wall flat) has a substantially linear correlation with improvements to energy absorption. More specifically, the energy absorption in the angled section 30 starts to see some diminishing returns after about 10 mm in length, which is shown with the slope becoming less steep from about 10 mm to about 13 mm, while the slope is relatively steeper from about 8 mm to about 10 mm. In comparison, the energy absorption for the flat or horizontal section 28 continues to increase linearly the as its length increases. Therefore, as the angled sections 30 are shortened to lengthen the horizontal sections 28, the energy absorption should be improved. This correlation between the characteristics for the angled and horizontal 30, 28 portions allows the intermediate bends 26 to be formed at locations in the top and bottom wall sections 22, 24 that realize the energy absorption potential for the overall length selected for the top and bottom wall sections 22, 24.

Figure 7:
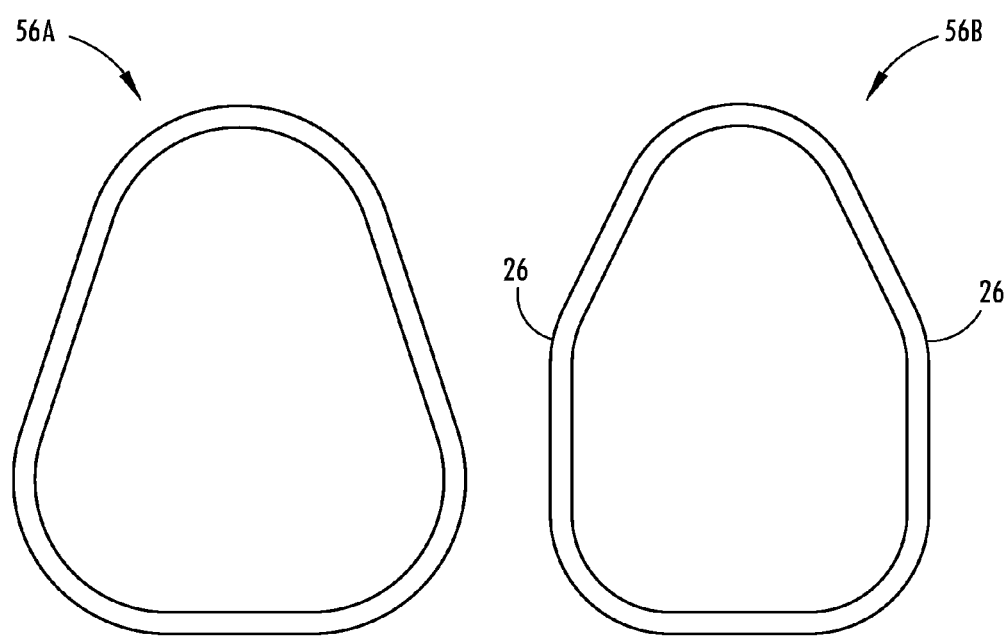
FIGS. 7 and 8, respectively, show schematic cross-sectional shapes of two different impact beams and the corresponding force displacement curves illustrated in a chart for the impact beams associated with these two cross-sectional shapes.
Figure 8:
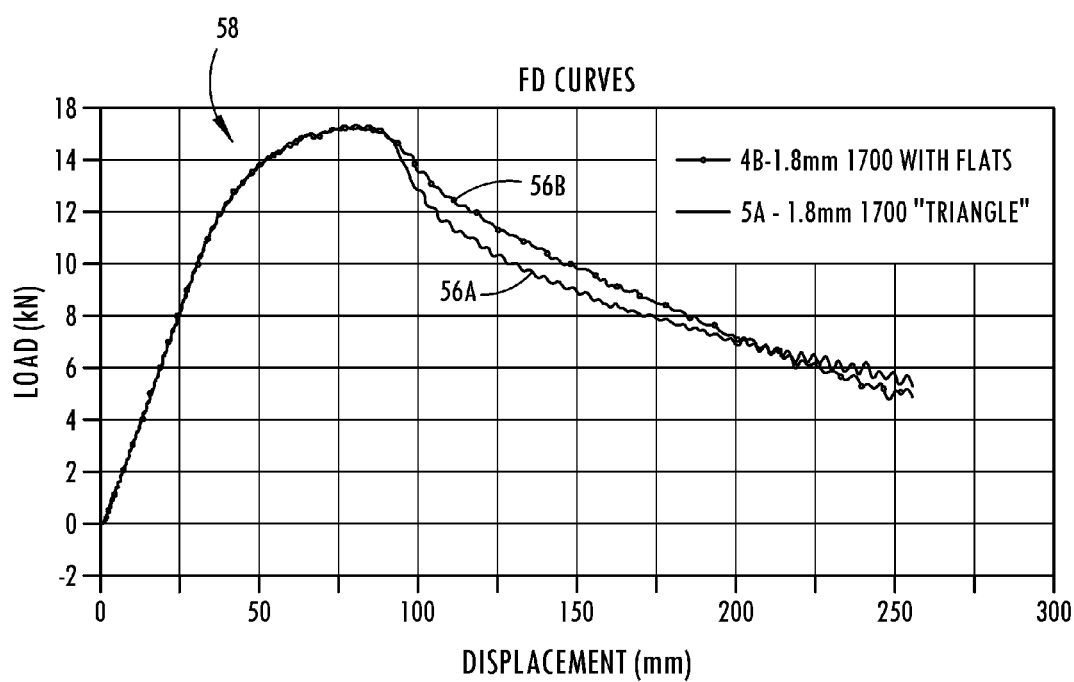

To demonstrate the energy absorption improvements provided by including the intermediate bends 26 in the top and bottom wall sections 22, 24, a force deflection curve (FIG. 8) for two exemplary cross-sectional shapes 56A and 56B (FIG. 7) shows substantially identical loading characteristics to a peak loading point 58. From the peak loading point 58, the energy absorption by the beam 56B having the intermediate bends has a significant improvement in performance during bending. More specifically, the beam 56B with the intermediate bends 26 provides about 1730 J of energy absorption, while the beam 56A with the triangular shaped cross section and no intermediate bends provides about 1670 J of energy absorption. These beams are used in the comparison of the force deflection curves have a relative equal mass of about 1.4 kg, a wall thickness of about 1.9 mm, and are formed from a martensitic steel having a tensile strength of about 1,700 MPa.

The illustrated embodiment of the elongated beam 12, as shown in FIGS. 2-5, has a cross-sectional shape that is closed to surround an interior volume 44 of the elongated beam 12, which provides the interior wall section 40 as a substantially planar wall section. Accordingly, the illustrated interior walls section 40 is orthogonal to the substantially horizontal sections 28 of the top and bottom wall sections 22, 24 of the elongated beam 12. The planar shape of the interior wall section 40 provides a direct connection between the interior side of the top and bottom wall sections 22, 24, thereby minimizing the amount of material used to interconnect the top and bottom wall sections 22, 24. The transition bends 60 between the interior wall section 40 and the top and bottom wall sections 22, 24 has an inside radius generally equal to the inside radius 48 of the contact portion 18 (i.e. the bend point of the exterior wall section 42). Again, the interior wall section 40 functions to withstand tensile forces applied from impact forces F to the contact portion 18. The illustrated embodiment of the elongated beam 12 (FIGS. 2-5) has a resulting overall lateral width dimension W of about 35 mm and a vertical height dimension H of about 30 mm.

With respect to the method of forming the impact beam, the elongated beam 12 may be roll formed by a series of rollers that interfaces with a continuous sheet of metal that moves through the rollers to form the cross-sectional shape of the elongated beam. Separate individual rollers in a roll form line are configured to sequentially form the rounded bend point in the exterior wall section 42, the intermediate bends 26 in the top and bottom wall sections 22, 24, and the transition bends 60 between the interior wall section 40 and the top and bottom wall sections 22, 24. Several flower patterns or steps to intermittently form these bends may be implemented to arrive at the desired cross-sectional shape of the present invention. The edges of the sheet of metal may be attached to enclose and hold the closed cross-sectional shape by welding, such as induction welding at a weld station at the end of the roll former, to form a weld seam 55 along the length of the elongated beam that connects edges of the roll formed metal sheet, such as at the location shown in FIG. 5, thereby rigidly holding the cross-sectional shape in place around the interior volume of the elongated beam. The weld seam may be continuous or intermittent and may be located in a position to reduce compressive and tensile impact stresses on the weld seam, which could result in a bending failure at the weld. Accordingly, the weld seam is preferably formed at one of the top or bottom wall sections 22, 24 to reduce compressive and tensile impact stresses at the weld seam. More specifically, the weld seam is preferably formed in the flat or horizontal portions of the top or bottom wall sections, such as at the weld seam 55 location illustrated in FIG. 5. Upon exiting the weld station, the beam is cut into elongated beam sections at lengths desired for the corresponding door type and/or vehicle design, such as at a cutting station.

The elongated beam 12 with the cross-sectional shape of the present invention may be formed with various metals and processing techniques, including the aforementioned roll forming process. In use with the roll forming process, it is contemplated that the impact beam is roll formed from martensitic steel having a tensile strength of at least about 1,700 MPa and cold formed into a substantially continuous sheet with a thickness preferably between about 1 mm and about 2 mm, and more preferably about 1.8 mm. However, it is also conceivable that the elongated beam 12 may be formed with other thicknesses and grades of steel, aluminum, and other metal alloys to provide the cross-sectional shape of the present invention with the intermediate bends that function to prevent displacement of the elongated beam 12 toward an interior side of the vehicle door 14 from an impact force on the exterior side of the vehicle door 14. With other contemplated forming techniques, the bend point and the intermediate bends as described herein may be shapes in the cross section that are formed from non-bending processing techniques, such as extrusion forming process.

For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An impact beam for reinforcing a vehicle door, the impact beam comprising:
   an elongated beam having a hollow interior spanning a length of the elongated beam and an impact portion spanning the length and configured to face an exterior side of the vehicle door;
   wherein the elongated beam includes a cross-sectional shape having a top wall section and a bottom wall section that interconnect at a bend section of the cross-sectional shape that includes the impact portion; and
   wherein the top and bottom wall sections each include an intermediate bend to define a substantially horizontal section and an angled section on opposing sides of the intermediate bend, the intermediate bends configured to prevent inward displacement of the elongated beam from an impact force at the exterior side of the vehicle door.

2. The impact beam of claim 1, wherein the cross-sectional shape of the elongated beam includes an interior wall section that interconnect the top and bottom wall sections at a side of the cross-sectional shape opposite the bend section.

3. The impact beam of claim 2, wherein the interior wall section includes a substantially planar portion that is generally orthogonal to the substantially horizontal sections of the top and bottom wall sections.

4. The impact beam of claim 1, wherein the intermediate bend points are provided at substantially equal locations on the top and bottom wall sections, such that the cross-sectional shape is generally symmetrical about a substantially centered horizontal line.

5. The impact beam of claim 1, wherein a length of at least one of the substantially horizontal portions is greater than or equal to a length of the angled portion adjacent to the at least one of the substantially horizontal portions.

6. The impact beam of claim 1, further comprising mounting brackets attached at ends of the elongated beam that are configured to be mounted at the vehicle door, such that the elongated beam is arranged at a height configured to receive lateral side-impact forces at the impact portion.

7. The impact beam of claim 1, wherein the elongated beam includes a weld seam formed along the length of the elongated beam at one of the top and bottom wall sections so as to reduce compressive and tensile impact stresses on the weld seam when the elongated beam undergoes bending from a lateral side-impact force at the exterior side of the vehicle door.

8. The impact beam of claim 1, wherein the cross-sectional shape of the elongated beam is closed and includes a weld seam along the length of the elongated beam that connects edges of a metal sheet that forms the elongated beam.

9. The impact beam of claim 1, wherein the bend section is rounded and includes an inside radius greater than or equal to about four times a thickness of a metal sheet that forms the elongated beam.

10. The impact beam of claim 9, wherein the metal sheet comprises a martensitic steel having a tensile strength of at least about 1,700 MPa.

11. A door impact beam, comprising:
    an elongated hollow beam having a side-impact surface configured to face toward an exterior side of a vehicle door and opposing ends configured to be disposed at a peripheral frame of the vehicle door;

wherein the elongated hollow beam includes a cross-sectional shape having a top wall section and a bottom wall section that interconnect at a rounded impact point that includes the side-impact surface;

wherein the top and bottom wall sections of the cross-sectional shape each include a first substantially planar section and a second substantially planar section angled from the first substantially planar section, where the second substantially planar sections of the top and bottom wall sections interconnect at the rounded impact point; and wherein a length of at least one of the first substantially planar sections is greater than or equal to a length of the corresponding second substantially planar section so as to resist displacement of the elongated hollow beam toward an interior side of the vehicle door from an impact force at the exterior side of the vehicle door.

12. The door impact beam of claim 11, wherein the cross-sectional shape includes an interior wall section opposite the rounded impact point, and wherein the interior wall section includes a substantially planar portion generally orthogonal to at least one of the first planar sections of the top and bottom wall sections.

13. The door impact beam of claim 11, wherein the cross-sectional shape of the elongated hollow beam is generally symmetrical along the length of the elongated hollow beam about a plane generally centered between the top and bottom wall sections.

14. The door impact beam of claim 11, wherein the elongated hollow beam includes a weld seam formed along the length of the elongated hollow beam at one of the top and bottom wall sections to connect edges of a metal sheet used to form the elongated hollow beam.

15. The door impact beam of claim 14, wherein the rounded impact point includes an inside radius greater than or equal to about four times a thickness of the metal sheet.

16. The door impact beam of claim 11, wherein the elongated hollow beam is roll formed from a martensitic steel sheet having a tensile strength of at least about 1,700 MPa.

17. An impact device for preventing inward displacement of a vehicle door, the impact device comprising:
an elongated beam roll formed from a metal sheet and having a contact portion configured to face an exterior side of the vehicle door;
a pair of mounting brackets attached at opposing end portions of the elongated beam; and
wherein the elongated beam includes a cross-sectional shape extending between the mounting brackets and having a top wall section and a bottom wall section that each include an intermediate bend to define a first planar section and a second planar section on opposing sides of the intermediate bend, the first planar sections being substantially parallel with each other and the second planar sections being angled toward each other.

18. The impact device of claim 17, wherein the second planar sections of the top wall section and the bottom wall section integrally interconnect at the contact portion.

19. The impact device of claim 18, wherein the cross-sectional shape of the elongated beam includes a rounded bend point between the second planar sections of the top and bottom wall sections, the round bend point having an inside radius greater than or equal to about four times a thickness of the metal sheet.

20. The impact device of claim 19, wherein the metal sheet comprises a martensitic steel having a tensile strength of at least about 1,700 MPa, and wherein a length of the first planar sections are greater than or equal to a length of the second planar sections.

* * * * *